US007647443B1

(12) United States Patent
Chatterjee et al.

(10) Patent No.: US 7,647,443 B1
(45) Date of Patent: Jan. 12, 2010

(54) IMPLEMENTING I/O LOCKS IN STORAGE SYSTEMS WITH REDUCED MEMORY AND PERFORMANCE COSTS

(75) Inventors: Paresh Chatterjee, Fremont, CA (US); Ajit Narayanan, Chennai (IN); Loganathan Ranganathan, Fremont, CA (US); Sharon Enoch, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 67 days.

(21) Appl. No.: 12/101,240

(22) Filed: Apr. 11, 2008

Related U.S. Application Data (60) Provisional application No. 60/923,332, filed on Apr. 13, 2007.

(51) Int. Cl.
*G06F 12/14* (2006.01)
*G06F 17/30* (2006.01)
*G06F 12/00* (2006.01)

(52) U.S. Cl. .................. 710/200; 711/147; 711/163; 707/8

(58) Field of Classification Search ............. 710/200
See application file for complete search history.

(56) References Cited

U.S. PATENT DOCUMENTS

| 6,678,772 | B2 * | 1/2004 | McKenney ............. 710/200 |
|---|---|---|---|
| 6,823,511 | B1 * | 11/2004 | McKenney et al. ........ 718/102 |
| 7,346,720 | B2 * | 3/2008 | Fachan ................. 710/200 |
| 7,380,073 | B2 * | 5/2008 | Shorb ................. 711/152 |
| 2002/0138706 | A1 * | 9/2002 | Hugly ................. 711/163 |
| 2004/0068607 | A1 | 4/2004 | Narad |
| 2005/0039049 | A1 * | 2/2005 | Chang et al. ............ 713/201 |
| 2005/0114609 | A1 * | 5/2005 | Shorb ................. 711/152 |
| 2005/0149634 | A1 * | 7/2005 | McKenney ............. 709/248 |
| 2007/0094431 | A1 * | 4/2007 | Fachan ................ 710/200 |
| 2007/0101071 | A1 * | 5/2007 | McKenney ............. 711/152 |
| 2007/0136385 | A1 | 6/2007 | Abrashkevich et al. |
| 2007/0233990 | A1 | 10/2007 | Kucznski et al. |
| 2008/0168458 | A1 | 7/2008 | Fachan et al. |
| 2008/0222331 | A1 * | 9/2008 | Shorb ................. 710/200 |
| 2008/0282057 | A1 | 11/2008 | Layden et al. |
| 2008/0320262 | A1 * | 12/2008 | McKenney et al. ......... 711/163 |

OTHER PUBLICATIONS

Hsieh et al., "Scalable reader-writer locks for parallel systems"; Parallel Processing Symposium; 1992 Procedings; Sixth International; pp. 656-659.*

(Continued)

*Primary Examiner*—Ryan M Stiglic
(74) *Attorney, Agent, or Firm*—Hope Baldauff Hartman, LLC (57) ABSTRACT

Technologies are described for implementing locks to control I/O operations in a storage system. The lock implementations can have reduced resource requirements for memory and processing. Through the utilization of the technologies and concepts presented herein, an I/O process preparing to acquire a write lock can advertise its need for the lock for a pre-determined time before the lock is granted. The time period for advertisement can be specified so that all I/O operations that were initiated before the advertisement are guaranteed to have completed by the time the advertisement period is over. As such, a lock controller may only need to track outstanding I/Os that begin once the advertisement starts. This can reduce the typical requirement to maintain and process a lock structure for every unit of storage in the system at all times.

20 Claims, 8 Drawing Sheets

OTHER PUBLICATIONS

Krieger et al; "A Fair Fast Scalable Reader-Writer Lock"; 1993; Proc. Intl.; Conference on Parallel Processing; Department of Electrical and Computer Engineering; University of Toronto, Canada; 4 pages.*
McKenney;"Selecting locking primitives for parallel programming"; Oct. 1996; Communication of the ACM; vol. 39, issue 10; pp. 75-82.*
Mellor-Crummey et al.; "Scalable Reader-Writer Synchronization for Shared-Memory Multiprocessors"; 1991; pp. 106-113.*

U.S. Notice of Allowance / Allowability dated Jan. 14, 2009 in U.S. Appl. No. 11/417,802.
U.S. Appl. No. 11/417,802, filed May 4, 2006, entitled "Method, System, Apparatus, and Computer-Readable Medium for Locking and Synchronizing Input/Output Operations in a Data Storage System," Inventors: Chatterjee et al.

* cited by examiner

IMPLEMENTING I/O LOCKS IN STORAGE SYSTEMS WITH REDUCED MEMORY AND PERFORMANCE COSTS

CROSS-REFERENCE TO RELATED APPLICATIONS

This application claims the benefit of U.S. provisional patent application No. 60/923,332, filed on Apr. 13, 2007, and entitled "Novel Method of Implementing Locking I/Os in a Storage System" which is expressly incorporated herein by reference in its entirety.

BACKGROUND

A virtualized cluster is a cluster of different storage nodes that together expose a single storage device. Input/Output operations ("I/Os") sent to the cluster are internally re-routed to read and write data to the appropriate locations. In this regard, a virtualized cluster of storage nodes can be considered analogous to collection of disks in a Redundant Array of Inexpensive Disks ("RAID") configuration, since a virtualized cluster hides the internal details of the cluster's operation from initiators and presents a unified device instead.

In a virtualized cluster, preserving data integrity often requires providing a locking functionality. With locking protection, concurrent operations are guaranteed not to interfere with one another in ways that may corrupt data within the storage system. For example, when a table-based architecture is used to map I/O operations to physical sectors on a disk, the table must be locked prior to modification so as to avoid data loss. Such data loss may occur because of writes to invalid locations, reads from invalid locations, or overwriting new data with old data. Other data loss scenarios are also possible in the absence of locking.

Generally, two kinds of locks are commonly used. These are read locks and write locks. A traditional mechanism of locking uses a lock structure for each entity that may need to be locked. Such an entity may be a file, block, sector, stripe, etc. For example, a locking entity may be each 1 Gigabyte ("GB") block on a 200 GB disk. In this example, 200 lock structures need to be created and maintained in main memory at all times. Whenever a read lock is requested on a particular gigabyte, the appropriate lock structure is accessed. If there are no outstanding write requests, the read lock is granted and an appropriate variable is incremented in the structure to signal that there is one more outstanding reader on that particular 1 GB storage entity. If there are outstanding writes, the read lock request is queued until all writes have completed.

Similarly, if a write lock is requested on a particular gigabyte, the lock structure is accessed. If there are no outstanding reads or writes, then the write lock is granted and an appropriate variable is incremented in the structure to signal that there is one outstanding write in progress on the 1 GB entity. If there are reads and writes that are outstanding when the write lock is requested, the lock request is placed in a queue, where it will wait for all preceding requests to be completed.

Unfortunately, when using this approach, a lock structure needs to be maintained for every possible entity that may need to be locked, regardless of whether or not there are lock requests on it. This typically places a substantial demand on memory and processing resources. Some implementations attempt to reduce the memory required by the lock system through the use of a collection of lock structures that are accessed through a hash queue or a similar data structure. While this may reduce memory utilization, it can increase complexity and computing requirements. Such an approach can also place a hard limit on the number of outstanding operations that may be performed in a given storage system and thus does not scale well.

It is with respect to these considerations and others that the disclosure made herein is presented.

SUMMARY

Technologies are described herein for implementing locks to control I/O operations in a storage system. The lock implementations can have reduced resource requirements for memory and processing. Through the utilization of the technologies and concepts presented herein, an I/O process preparing to acquire a write lock can advertise its need for the lock at a predetermined time before the lock is needed. A lock structure can be created and used to track related I/O operations. The time period for advertisement can be specified so that all I/O operations that were initiated before the advertisement are guaranteed to have completed by the time the advertisement period is over. As such, the lock structure may only need to track outstanding I/Os that begin once the advertisement starts. This can reduce the typical requirement to maintain and process a lock structure for every unit of storage in the system at all times.

The amount of memory and processing overhead required for maintaining lock structures can be reduced by creating lock structures on the fly. Lock structures may only need to be created when there is a request for a write lock. The absence of such a lock structure for a particular storage entity can indicate that there are no pending writes related to the storage entity. A lock structure can contain a counter for the number of outstanding read locks. The lock structure can also support a timer that can be initialized to the advertising time for that lock. The advertising time can be long enough so that all I/Os pending prior to the start of advertising can be completed by the end of the advertising period. The lock structure can also track all read locks requested and granted during the advertising period. Once the timer reaches zero indicating that the advertising period is over, the current read locks are allowed to complete and then the write lock is granted. With the write lock grant, the protected write operation can take place. From the time that the timer reaches zero until the write lock is released, all new read lock requests are held in a queue.

Since the advertising period timer can be initialized with a value chosen to ensure that all outstanding operations are guaranteed to complete before the write lock is granted, the lock structure may not be required to account for read operations that were granted access before the write lock request was made. In this manner, it may no longer be necessary to track all locks on all locations (entities) at all times, but instead only operations within a certain time window around the granting of a write lock.

Often, processes that acquire write locks may occur with low frequency, may have lower priority, and may have scheduling flexibility. However, traditional locking systems that create and manage lock structures for all storage entities for all times may not take advantage of these properties of the write lock requesting processes. The approaches discussed herein may reduce the memory and computing footprint of a locking implementation in situations where writes are relatively infrequent and have some scheduling flexible.

It should be appreciated that the above-described subject matter may also be implemented as a computer-controlled apparatus, a computer process, a computing system, or as an article of manufacture such as a computer-readable medium.

These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to implementing I/O locks with reduced resource requirements for a data storage system. Through the use of the embodiments presented herein, write locks can be advertised prior to granting. Access to the related storage entity may need to only be controlled in temporal proximity to the lock advertisement.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for implementing I/O locks in a storage system with reduced memory and computational costs will be described.

Figure 1:
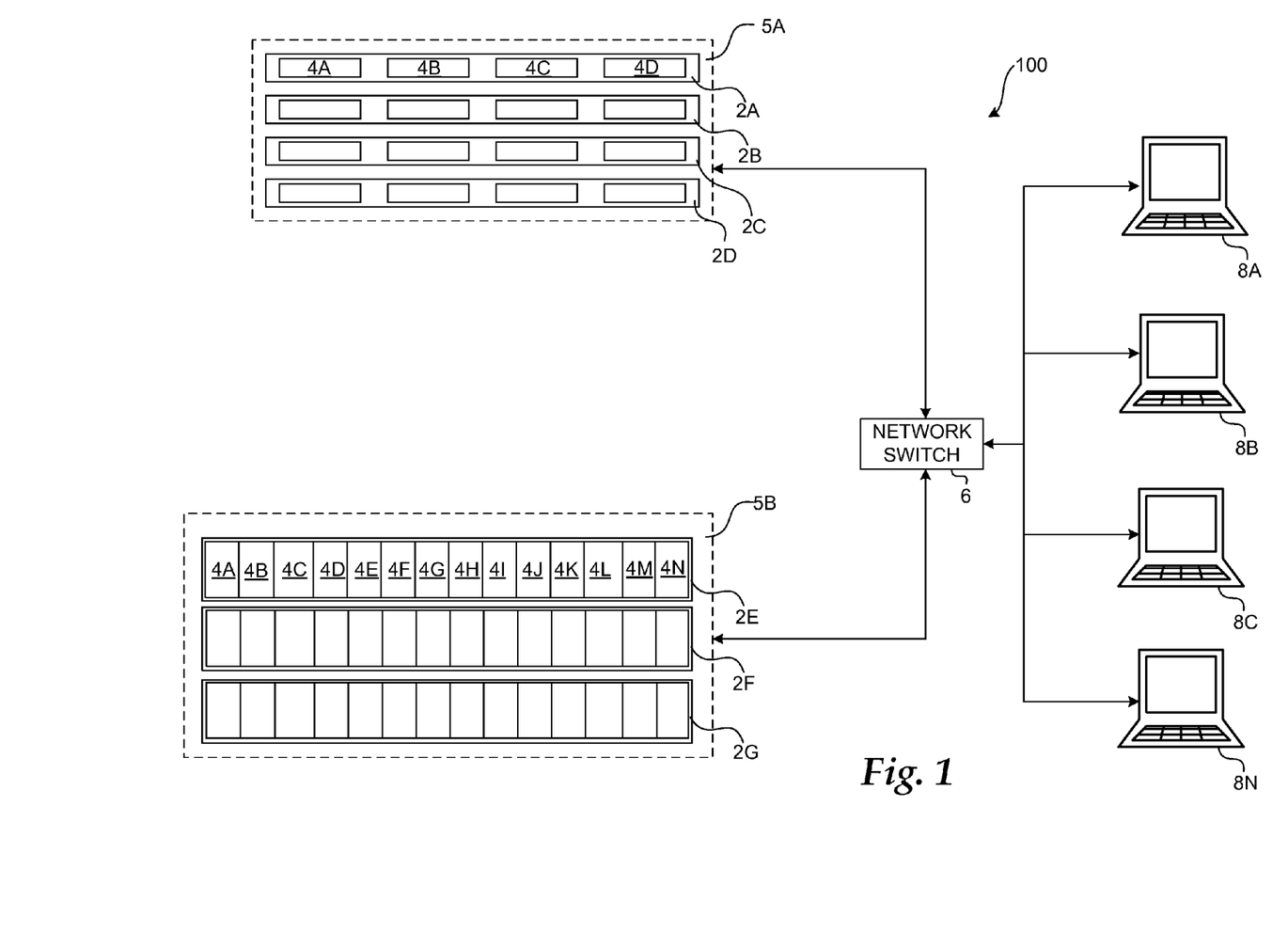
FIG. 1 is a network architecture diagram illustrating aspects of a storage system that includes several virtualized clusters according to one exemplary embodiment.

Turning now to FIG. 1, details will be provided regarding an illustrative operating environment for the implementations presented herein, as well as aspects of several software components that provide the functionality described herein for implementing I/O locks in a storage system with reduced memory and computational costs. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8N to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
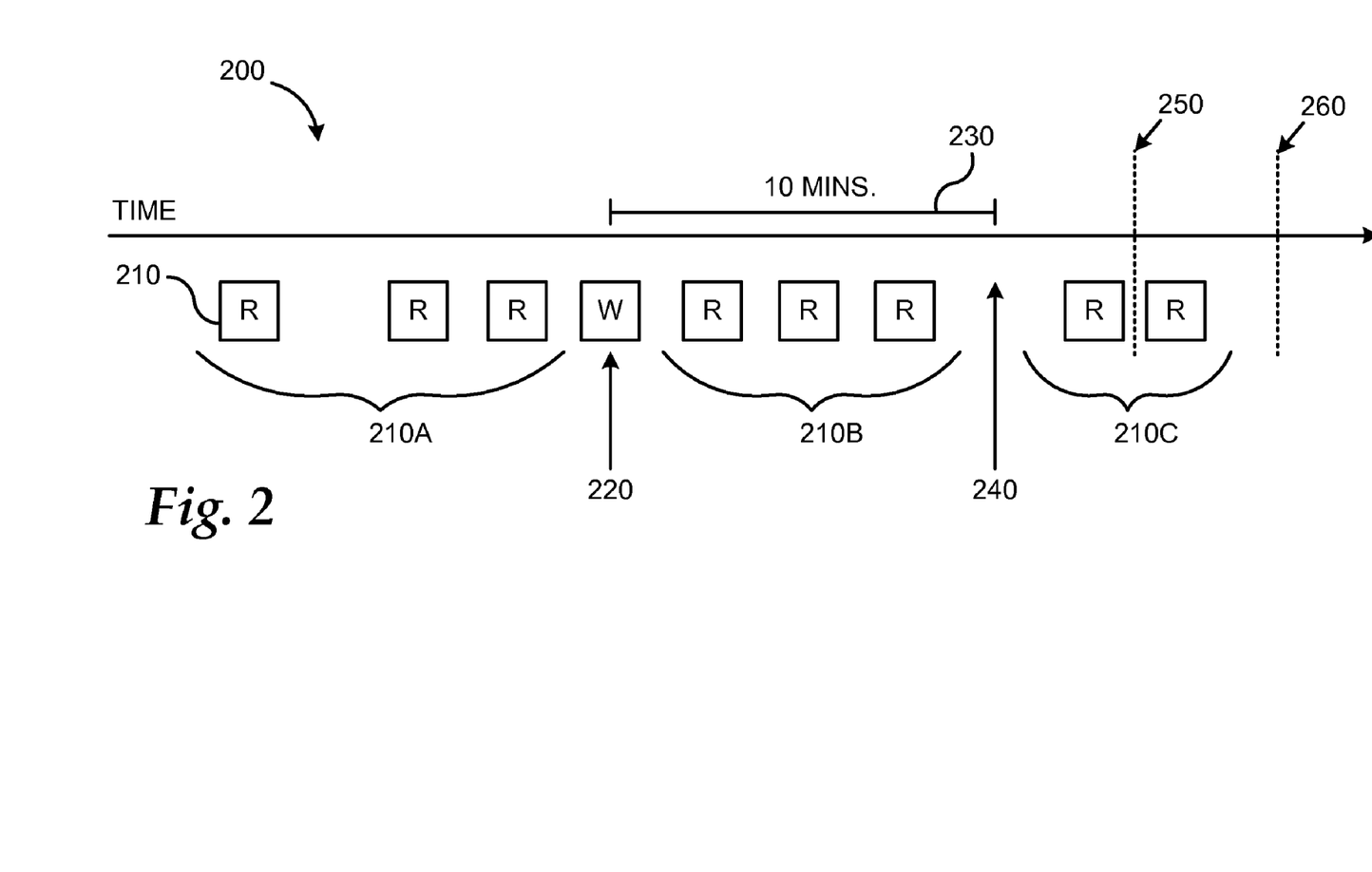
FIG. 2 is a timing diagram illustrating write lock request advertisement and granting according to one exemplary embodiment.

Referring now to FIG. 2, a timing diagram 200 illustrates write lock advertisement and granting according to one exemplary embodiment. Read lock requests 210 and write lock requests 220 may arrive at a storage system to request access to a given storage entity. A storage entity may be a file, block, sector, stripe, provision, or any other subdivision of a physical storage device. Upon the arrival of the write lock request 220, the system can begin to control and track access requests to the relevant storage entity. This can be referred to as advertising the write lock request 220. A lock structure can be used while performing tracking and advertising subsequent to arrival of the write lock request 220. Lock structures can be created as needed and all lock structures in a storage system may be centrally managed by a lock controller. The absence of a lock structure for a given storage entity may imply that no write lock request 220 is pending for that storage entity and that read accesses can be performed freely. Multiple processes may be allowed to read data simultaneously, but only one process may modify (that is, write to) a given storage entity at one time. Also, reading from a storage entity may not be allowed during the modification. As such, the lock controller must ensure that no reads are in progress when a write request is granted. Advertising of write lock requests 220 can assist with this control.

Once a write lock request 220 arrives, advertising can begin and a lock structure can be created. The lock structure can contain a counter that represents the advertisement period 230. The time duration of the advertisement period 230 can be selected to provide enough time to guarantee that all prior requests 210A will be completed by the end of the advertisement period 230. Prior requests 210A may be requests for reads that commenced prior to the start of the advertisement period 230. This can support the reduced requirement for the controller to only have to track advertisement period read locks 210B. Advertisement period read locks 210B can be read locks that arrive and are granted during the advertisement period 230. Prior requests 210A need not be tracked, because the length of the advertisement period 230 guarantees that prior reads will complete prior to the end of the advertisement period 230.

At the end of the advertisement period 230, read access can be suspended. Read lock requests that arrive after the advertisement period 230 can be referred to as post advertisement requests 210C. Post advertisement requests 210C may be temporarily queued. After the end of the advertisement period 230, all advertisement period read locks 210B can be tracked to await their completion. Since no new read locks have been issued, and all prior requests 210A have completed, there can be no reads in progress once all advertisement period read locks 210B complete. At such a time, the write lock grant 250 can finally occur. The protected write can then be processed by the requester and then the write lock release 260 can occur. After the write lock release 260, all of the post advertisement requests 210C that were queued can be granted. Also at this time, the lock structure can be removed, destroyed, freed, or released.

In the illustrated example, the advertisement period 230 is ten minutes long. Other periods, as required, may be specified. A global timer, real-time interrupt, or other timing mechanism may be used to process the individual lock structure counters for each individual advertising period 230. For example, every minute, a global timer thread may iterate through all current lock structures decrementing each structure's counter value by one minute. Appropriate handler functions can be triggered for any structures whose counter values have been decremented all the way to zero in a given period.

Lock structures can have several data elements. The first component may be a count of the number of outstanding read locks. The second component may be a count of the number of outstanding write locks. Generally, the number of outstanding write locks may only be one or zero. The third component may be a queue for read lock requests that is populated with any post advertisement requests 210C. The fourth component may be the timer.

Additionally, the lock structure may also be invoked with an appropriate priority. This parameter can determine the priority of the writing process in relation to the reading processes. If the reading processes have a higher priority, the arrival of a read lock request may cause the write lock to be denied, and/or the write lock to be released. In this manner, the operations of the reading process will not be interrupted by a writer. This may be used if the process requesting the write lock is optional, or can be rescheduled for later, or if the reader cannot be delayed. Similarly, a cancel mechanism may be implemented for a lock structure. The cancel may be used if a read priority is much higher than the write priority.

Figure 3:
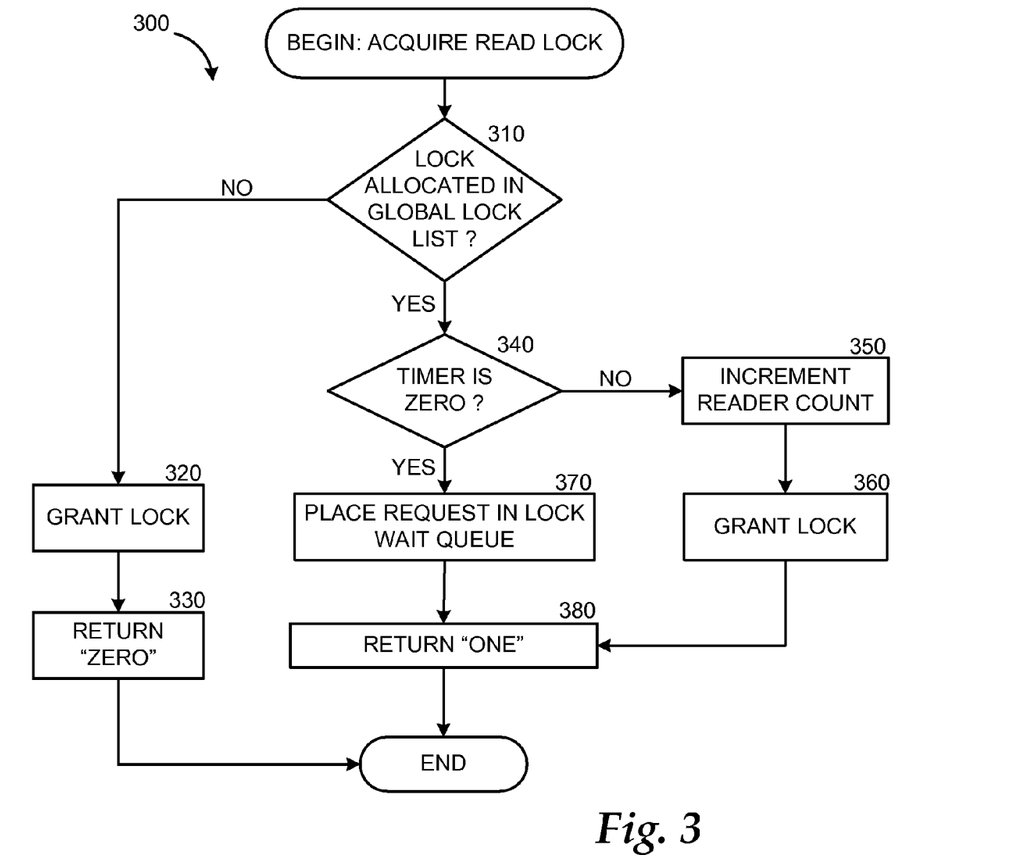
FIG. 3 is a logical flow diagram illustrating a process performed by storage server for acquiring a read lock according to one exemplary embodiment.

Turning now to FIG. 3, additional details will be provided regarding the embodiments presented herein for implementing I/O locks with reduced resource requirements for a data storage system. In particular, FIG. 3 is a flow diagram showing a routine 300 that illustrates aspects of an exemplary process performed by a storage server 2 for acquiring a read lock. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 300 can begin with operation 310 where it is determined if the lock controller has already allocated a lock structure for the given storage entity. A global lock list can be examined to make this determination. If no lock structure exists, then there are no write lock requests 220 pending for the given storage entity. As such, read lock may be granted freely and the routine 300 may continue to operation 320. If a lock structure does exist, then the routine 300 can continue to operation 340.

At operation 320, the read lock may be granted since there is no lock structure present at this time. Operation 330 returns a zero value to the lock requester. This zero can indicate to the requester that the read lock was given freely because the storage entity is not currently being controlled. As such, the requester need not release the read lock upon completion of the read I/O. Such a request is a prior request 210A and need not be tracked. The routine 300 can terminate after operation 330.

At operation 340, it is determined if the timer counter is currently zero. If the counter is at zero, then the advertisement period 230 is over and no read locks are being granted. Instead, the routine 300 continues to operation 370 where the read lock request is queued for granting after release of the write lock. Such a request is a post advertisement request 210C. If instead, at operation 340, it is determined that the counter is not at zero, the reader count is incremented at operation 350 to record that another advertisement period read lock 210B is being granted and operation 360 grants the read lock. From either operation 370 or operation 360, the routine 300 continues to operation 380 where a return value of one is provided to the lock requesting process to indicate that the granted lock should be released upon completion. Routine 300 can terminate after operation 380.

Figure 4:
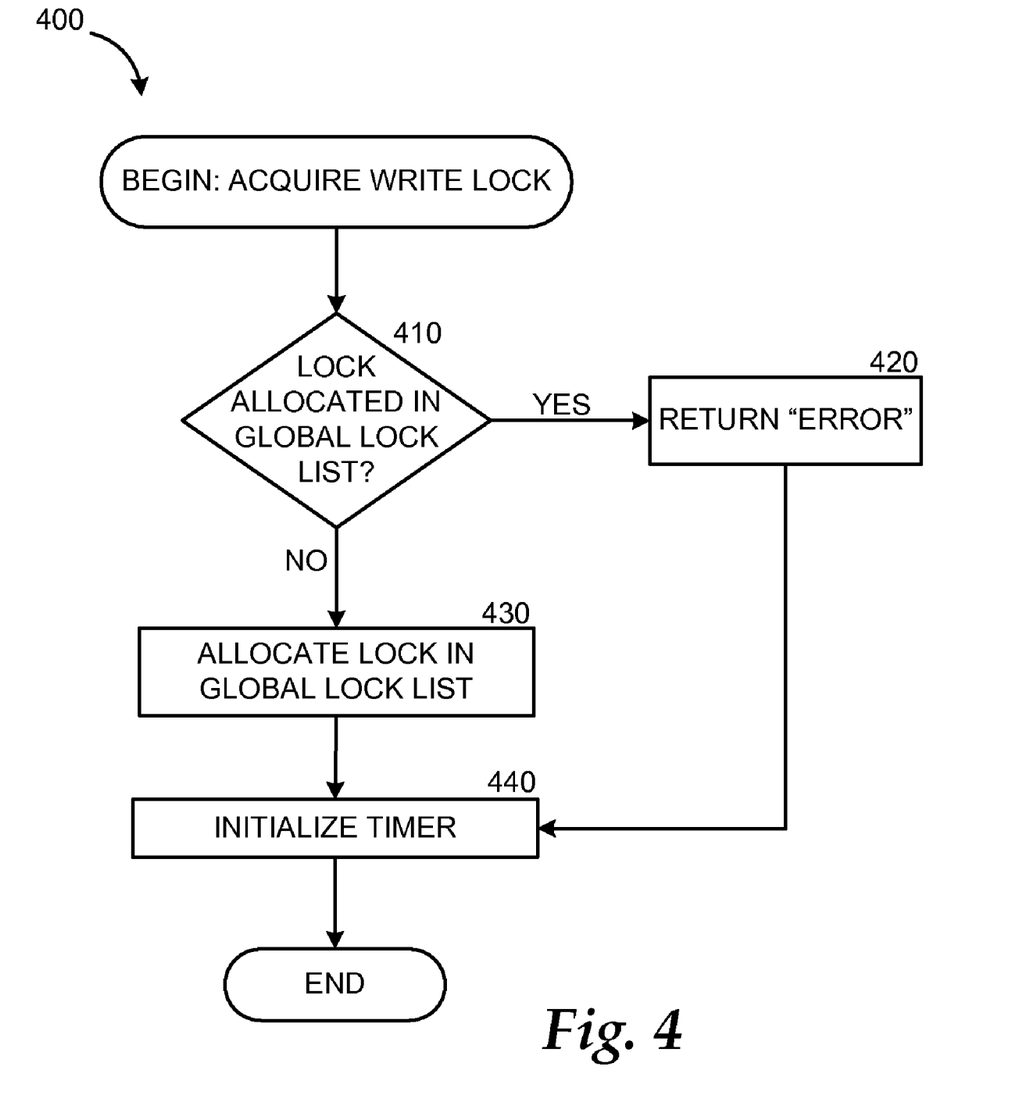
FIG. 4 is a logical flow diagram illustrating a process performed by storage server for acquiring a write lock according to one exemplary embodiment.

Turning now to FIG. 4, additional details will be provided regarding the embodiments presented herein for implementing I/O locks with reduced resource requirements for a data storage system. In particular, FIG. 4 is a flow diagram illustrating a routine 400 that shows aspects of an exemplary process performed by a storage server 2 for acquiring a write lock. The routine 400 can begin with operation 410 where it is determined if the lock controller has already allocated a lock structure for the given storage entity. A global lock list can be examined to make this determination. If no lock structure exists, the routine 400 can continue to operation 430. If a lock structure does exist, then the routine 400 can continue to operation 420.

Operation 420 is reached if there is already a lock structure in the global lock list. This means that a write lock request 220 is already waiting or has been granted. Since only one write lock can operate at a time, the newly requested lock is returned with an error message from operation 420 indicating that the storage entity is already being written to. The routine 400 can terminate after operation 420.

Operation 430 is reached if there is no lock structure in the global lock list. A lock structure is allocated in operation 430. In operation 440, the timer counter within the lock structure is initialized. The timer may be set to a value that is determined for system-wide use, or a value for the specific type of data involved, or a value may be passed in by the requestor. Various other mechanisms for determining the initial value of the timer counter can be implemented as required by operation of the storage system. The timer value may be specified to guarantee that all prior requests 210A will be completed prior to the timer expiring. The routine 400 can terminate after operation 440.

Figure 5:
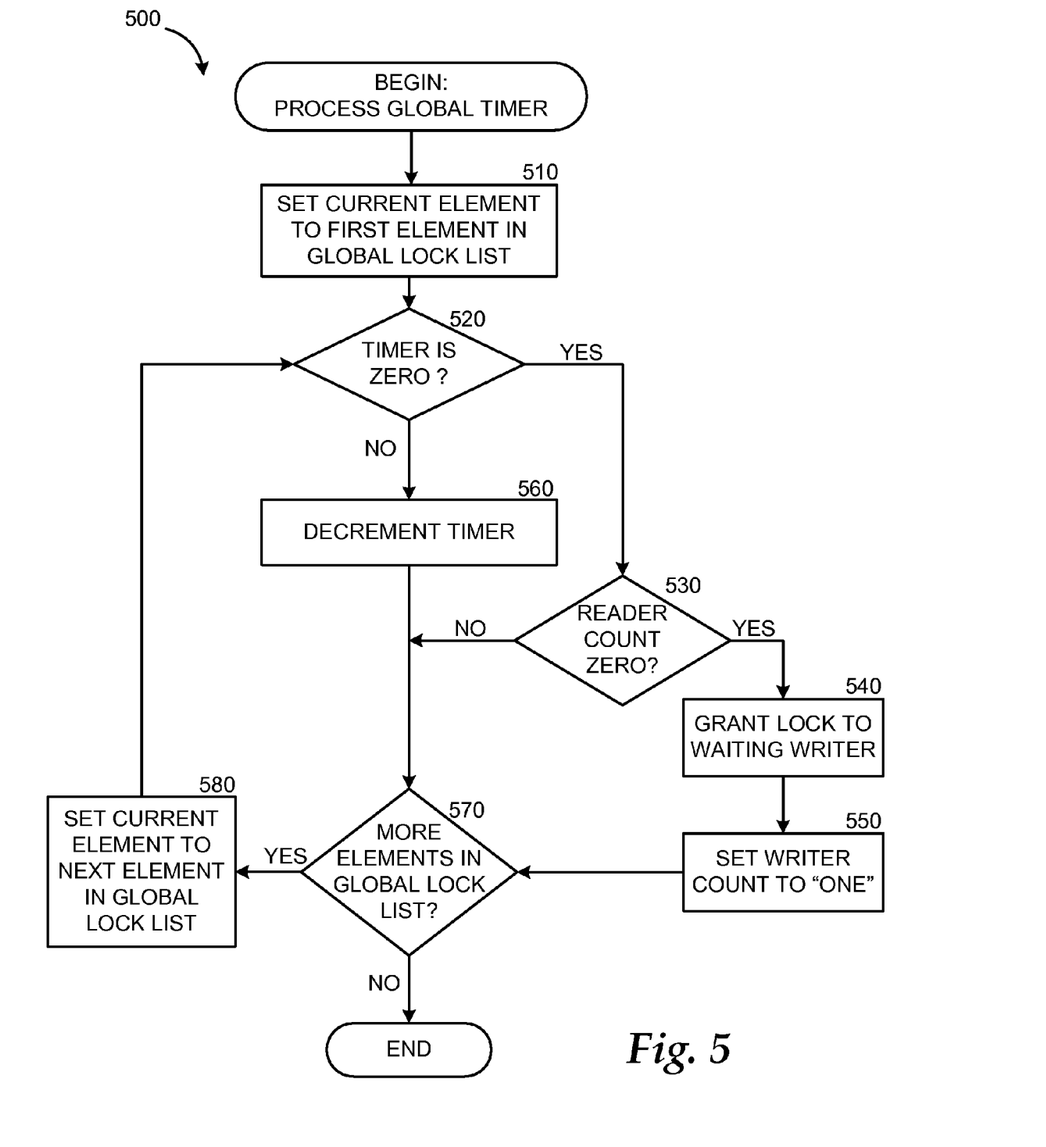
FIG. 5 is a logical flow diagram illustrating a process performed by storage server for processing a global timer according to one exemplary embodiment.

Turning now to FIG. 5, additional details will be provided regarding the embodiments presented herein for implementing I/O locks with reduced resource requirements for a data storage system. In particular, FIG. 5 is a flow diagram illustrating a routine 500 that shows aspects of an exemplary process performed by a storage server 2 for processing a global timer. The routine 500 can begin with operation 510 where the current element is set to the first element in the global lock list. This can initialize the iteration through the whole list to start at the first element of the list. Any other pattern of iteration or data structure traversal may also be used as long as all lock structure elements are processed.

At operation 520, it is determined if the timer for the current element is at zero. If the timer is zero, the routine 500 continues to operation 530. If the timer is not at zero the routine 500 continues to operation 560. At operation 560, the timer counter of the current lock structure element is decremented by one. The routine 500 can continue to operation 570 from operation 560.

At operation 530, it is determined if the reader count is at zero. If the reader count is at zero, then the advertisement period is over and there are no open read locks. Thus, the routine 500 can continue to operation 540 where the write lock is granted to the waiting write process. Operation 550 sets the writer count within the current lock structure to one to indicate that a writer is active. From operation 550, the routine 500 can continue to operation 570. If operation 530 instead determined that the reader count is not at zero then the write lock cannot yet be granted and the routine 500 continues to operation 570.

In operation 570 it is determined if there are more elements to process from the global lock list or if the list is complete. If there are more elements, the routine continues to operation 580 where the current element is advanced to the next element in the list. Next, the routine 500 can loop back to operation 520 where the routine 500 continues as described above. If operation 570 instead determines that there are no additional elements in the global lock structure, the routine 500 may terminate.

Figure 6:
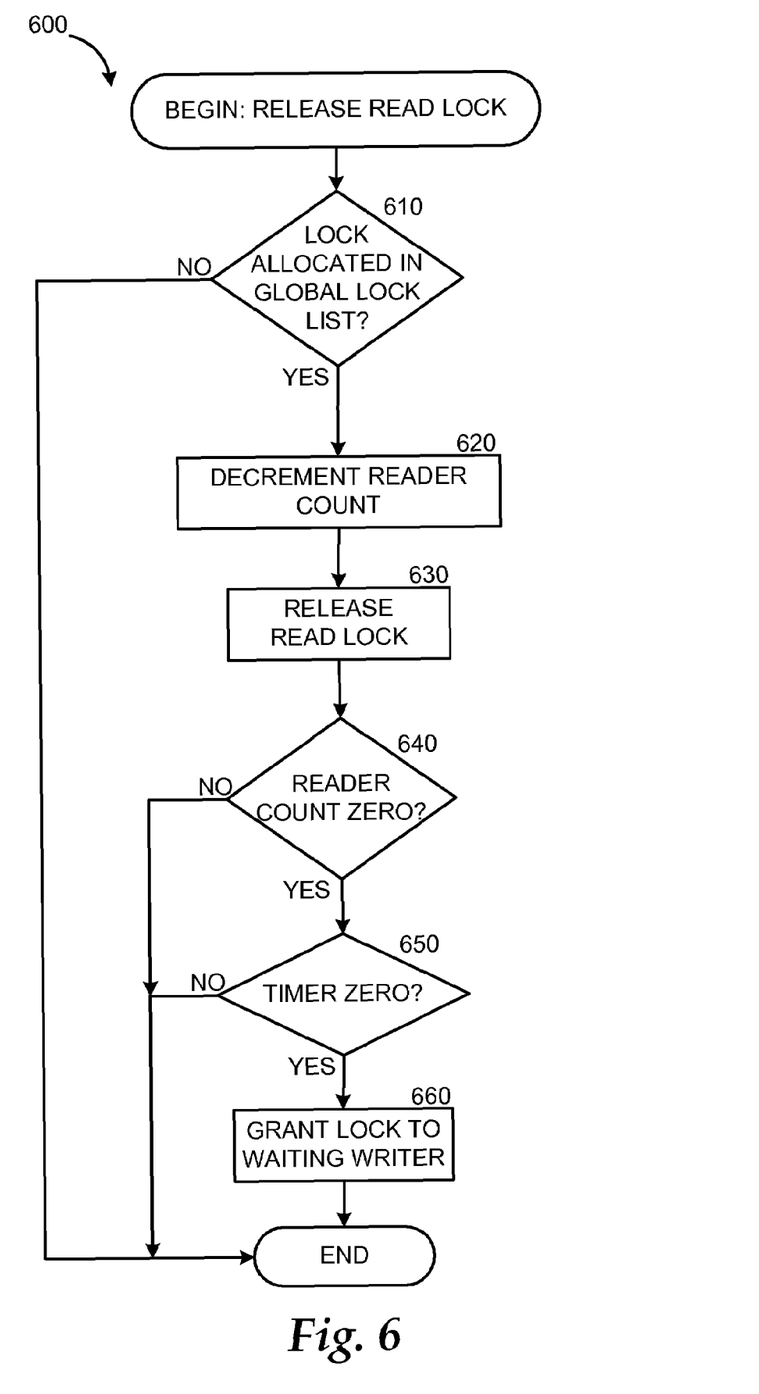
FIG. 6 is a logical flow diagram illustrating a process performed by storage server for releasing a read lock according to one exemplary embodiment.

Turning now to FIG. 6, additional details will be provided regarding the embodiments presented herein for implementing I/O locks with reduced resource requirements for a data storage system. In particular, FIG. 6 is a flow diagram illustrating a routine 600 that shows aspects of an exemplary process performed by a storage server 2 for releasing a read lock. The routine 600 can begin with operation 610 where it is determined if a lock structure has been allocated for the given storage entity. A global lock list can be examined to make this determination. If no lock structure exists, the routine 600 can terminate. If a lock structure does exist, then the routine 600 can continue to operation 620.

At operation 620, the reader count within the lock structure is decremented by one to account for the completion of one of the pending read operations. The related read lock is released at operation 630.

Next, at operation 640, it is determined if the reader count is at zero. If the reader count is not yet zero, the routine 600 may terminate. If the reader count is zero then operation 650 can determine if the timer is at zero. If the timer is not at zero, the routine 600 may terminate. If the timer is at zero, operation 660 can grant the write lock to the waiting writer. The writer count can be incremented to the value of one at this time to designate that the writer is operating. After operation 660, the routine 600 may terminate.

Figure 7:
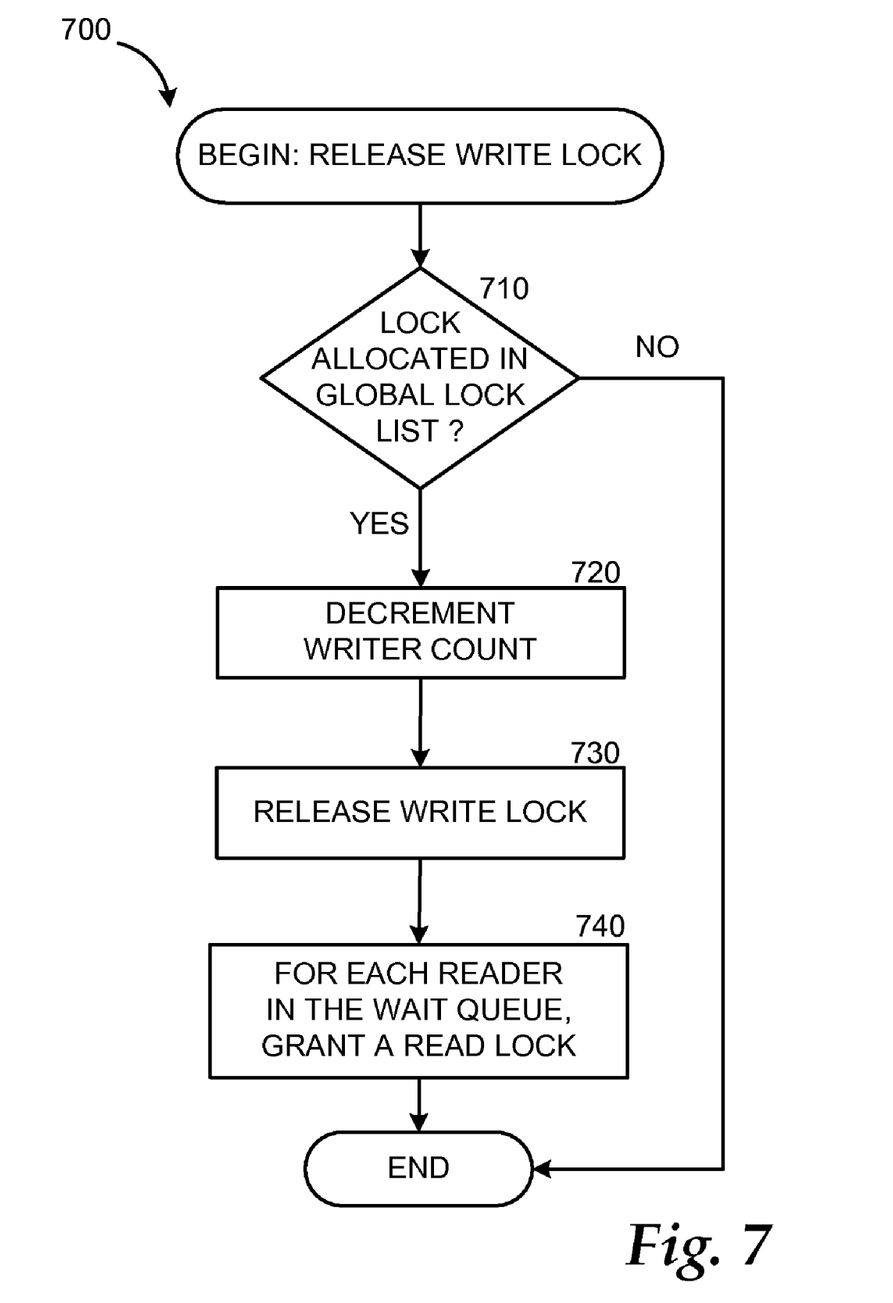
FIG. 7 is a logical flow diagram illustrating a process performed by storage server for releasing a write lock according to one exemplary embodiment.

Turning now to FIG. 7, additional details will be provided regarding the embodiments presented herein for implementing I/O locks with reduced resource requirements for a data storage system. In particular, FIG. 7 is a flow diagram illustrating a routine 700 that shows aspects of an exemplary process performed by a storage server 2 for releasing a write lock. The routine 700 can begin with operation 710 where it is determined if a lock structure has been allocated for the given storage entity. A global lock list can be examined to make this determination. If no lock structure exists, the routine 700 can terminate. If a lock structure does exist, then the routine 700 can continue to operation 720.

At operation 720, the writer count in the related lock structure can be decremented to zero to indicate that the write operation completed. In operation 730, the write lock can be released. In operation 740, the list of queued read requests can be retrieved from the lock structure and a read lock may be granted to each request in the queue. Optionally, the lock structure can be destroyed, or freed, or otherwise returned to the lock pool, or memory pool. After operation 740, the routine 700 may terminate.

Figure 8:
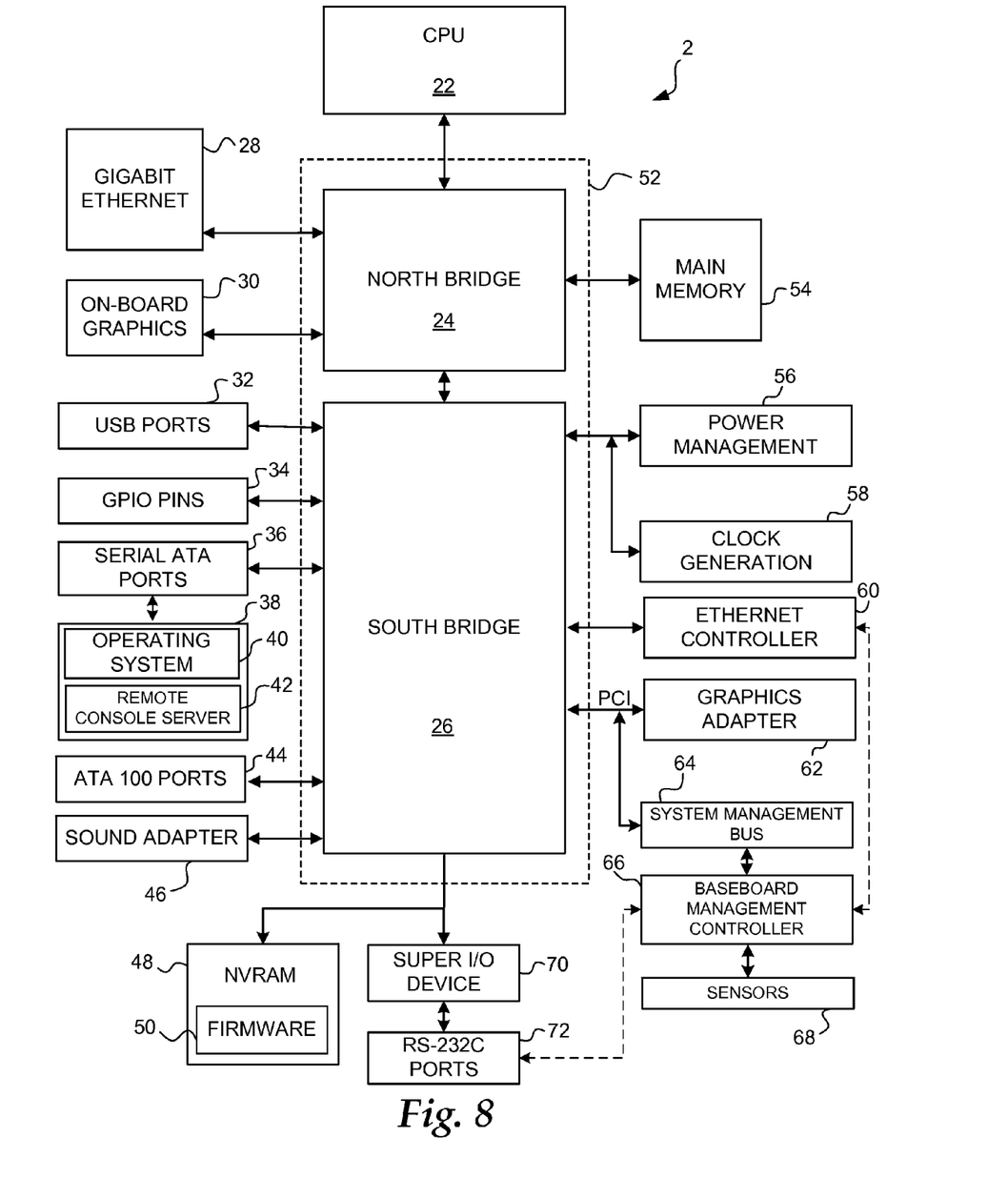
FIG. 8 is a computer architecture diagram illustrating a computer hardware architecture for a computing system capable of serving as a storage node according to one exemplary embodiment.

FIG. 8 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 8 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 26 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 8, may include other components that are not explicitly shown in FIG. 8, or may utilize an architecture completely different than that shown in FIG. 8.

Based on the foregoing, it should be appreciated that technologies for implementing I/O locks with reduced resource requirements for data storage systems are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for managing input/output locks in a data storage system, the method comprising:
   receiving a write lock request related to a data storage entity;
   operating a timer for a fixed duration of time in response to receiving the write lock request;
   granting read lock requests received during the fixed duration of time; and
   granting the write lock request after the fixed duration of time and after verifying release of each of the read locks granted during the fixed duration of time.

2. The method of claim 1, further comprising queuing read lock requests received after the fixed duration of time and before a release of the granted write lock.

3. The method of claim 2, further comprising granting each queued read lock request in response to the release of the granted write lock.

4. The method of claim 1, wherein operating the timer comprises initializing the timer to a duration sufficient to allow the completion of each of a plurality of prior read lock requests.

5. The method of claim 1, wherein operating the timer comprises periodically decrementing a timer value.

6. The method of claim 1, further comprising creating a lock data structure in response to receiving the write lock request; and destroying the lock data structure in response to a release of the granted write lock.

7. The method of claim 6, further comprising granting untracked read locks when the lock data structure is not present.

8. A computer storage medium having computer-executable instructions stored thereon which, when executed by a computer system, cause the computer system to:
   receive a write lock request related to a data storage entity;
   operate a timer for a fixed duration of time in response to receiving the write lock request;
   grant read lock requests received during the fixed duration of time; and
   grant the write lock request after the fixed duration of time and after verifying release of each of the read locks granted during the fixed duration of time.

9. The computer storage medium of claim 8, further causing the computer system to queue read lock requests received after the fixed duration of time and before a release of the granted write lock.

10. The computer storage medium of claim 9, further causing the computer system to grant each queued read lock request in response to the release of the granted write lock.

11. The computer storage medium of claim 8, wherein operating the timer comprises initializing the timer to a duration sufficient to allow the completion of each of a plurality of prior read lock requests.

12. The computer storage medium of claim 8, wherein operating the timer comprises periodically decrementing a timer value.

13. The computer storage medium of claim 8, further causing the computer system to create a lock data structure in response to receiving the write lock request; and destroy the lock data structure in response to the release of the granted write lock.

14. A data storage system comprising:
a storage subsystem;
a physical storage device associated with the storage subsystem; and
one or more lock controller modules operable to cause the storage subsystem to:
receive a write lock request related to a data storage entity;
operate a timer for a fixed duration of time in response to receiving the write lock request;
grant read lock requests received during the fixed duration of time; and
grant the write lock request after the fixed duration of time and after verifying release of each of the read locks granted during the fixed duration of time.

15. The data storage system of claim 14, wherein the lock controller modules are further operable to cause the storage subsystem to queue read lock requests received after the fixed duration of time and before a release of the granted write lock.

16. The data storage system of claim 15, wherein the lock controller modules are further operable to cause the storage subsystem to grant each queued read lock request in response to the release of the granted write lock.

17. The data storage system of claim 14, wherein operating the timer comprises initializing the timer to a duration sufficient to allow the completion of each of a plurality of prior read lock requests.

18. The data storage system of claim 14, wherein operating the timer comprises periodically decrementing a timer value.

19. The data storage system of claim 14, wherein the lock controller modules are further operable to cause the storage subsystem to create a lock data structure in response to receiving the write lock request; and destroying the lock data structure in response to the release of the granted write lock.

20. The data storage system of claim 19, wherein the lock controller modules are further operable to cause the storage subsystem to grant untracked read locks when the lock data structure is not present.

\* \* \* \* \*